Sept. 8, 1959    D. ROSS    2,903,270
COMBINED STROLLER AND CARRYING CASE
Filed Oct. 21, 1957    2 Sheets-Sheet 1
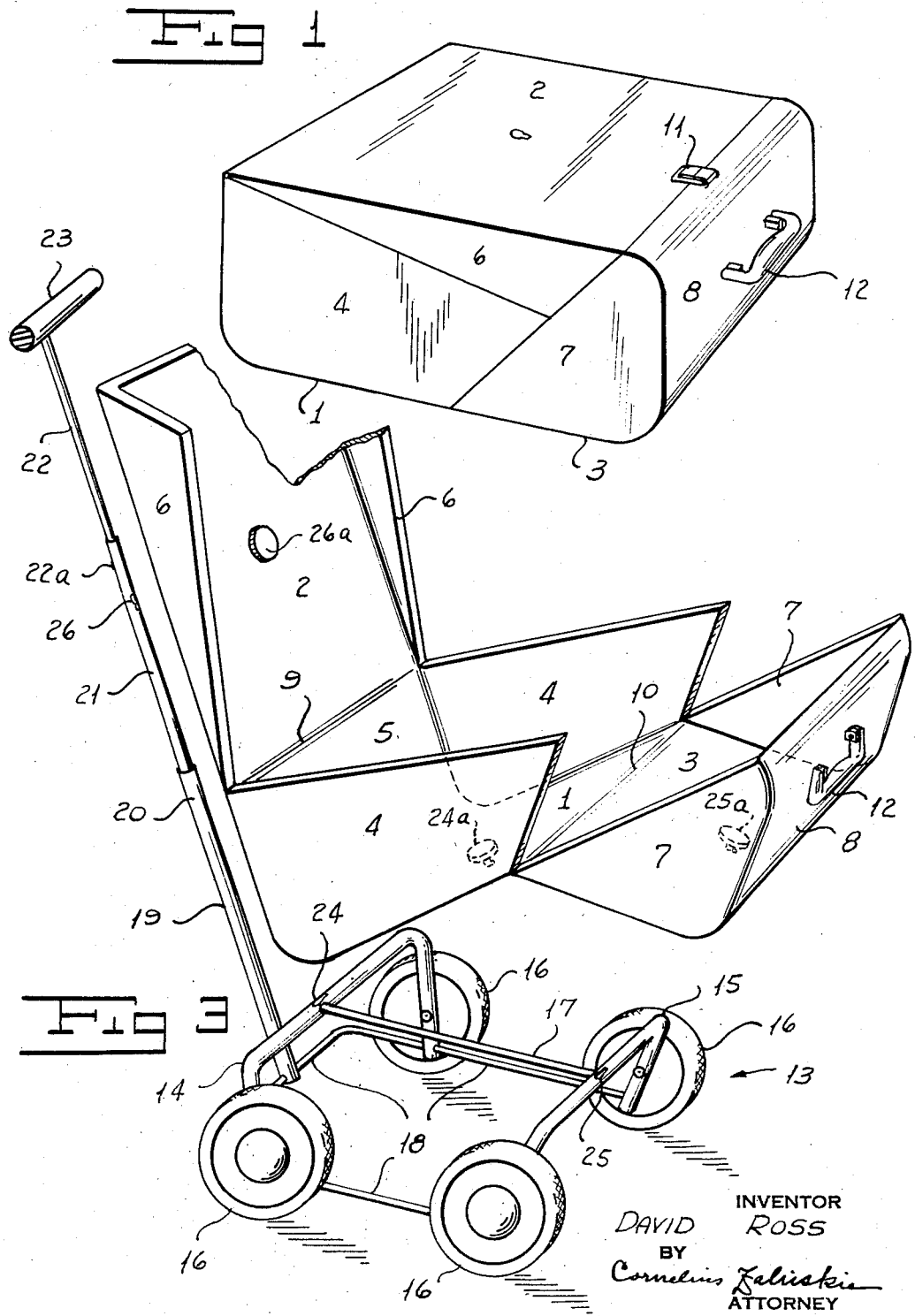
INVENTOR
DAVID ROSS
BY
Cornelius Zabriskie
ATTORNEY

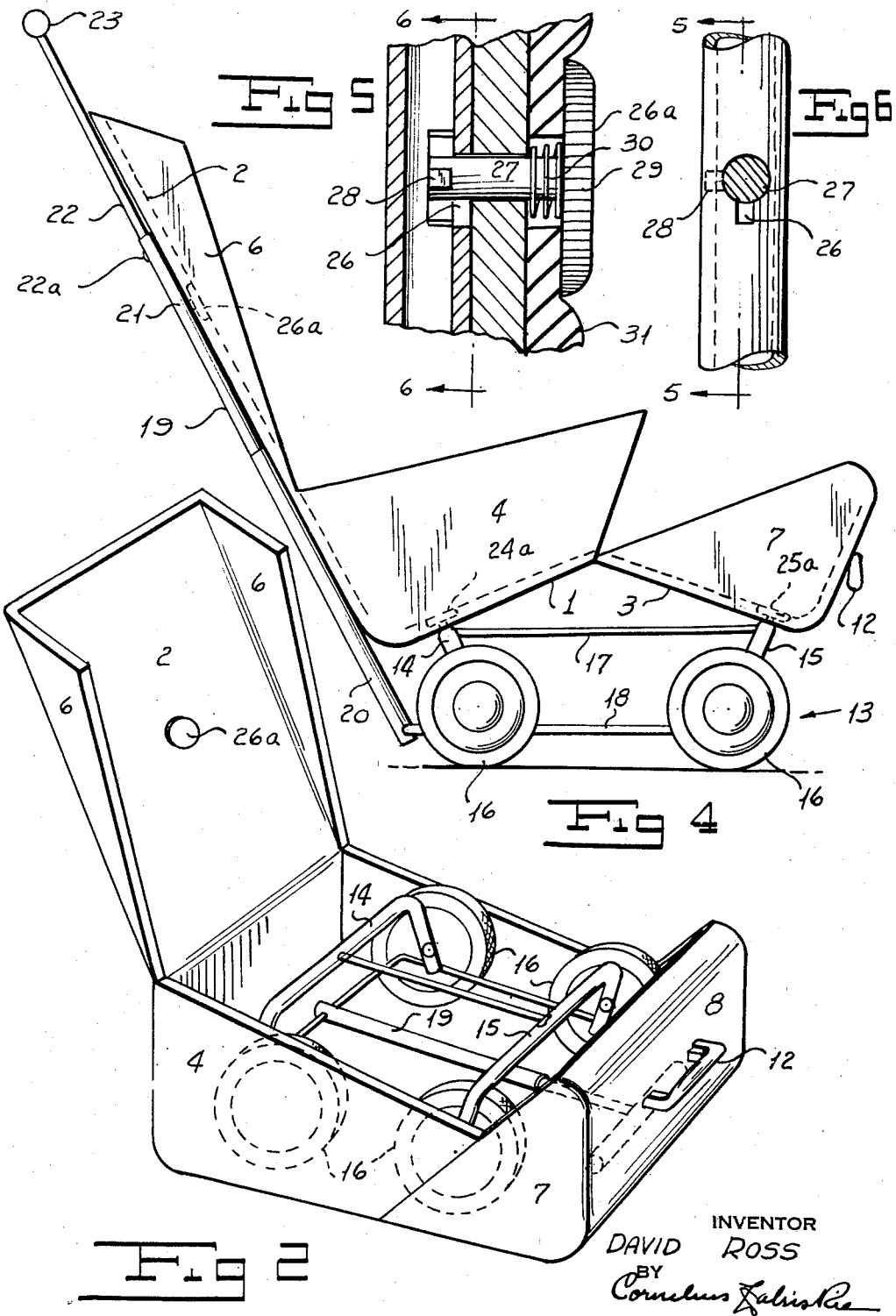

United States Patent Office 2,903,270
Patented Sept. 8, 1959

2,903,270

COMBINED STROLLER AND CARRYING CASE

David Ross, Flushing, N.Y.

Application October 21, 1957, Serial No. 691,329

1 Claim. (Cl. 280—37)

This invention is a stroller and carrying case and is directed more particularly to a structure wherein the stroller is so constituted that it may be folded into compact condition and, when so folded, will constitute a carrying case which appears to be an article of luggage. Structures of this general character have heretofore been suggested, but in every case of which I am aware their construction has been so complicated and heavy that they have not met with user favor.

The object of the present invention is to provide a combined stroller and case which will be of extreme simplicity, light in weight, economical to manufacture, and of low retail cost.

Speaking generally the stroller of the present invention comprises a body composed of a seat, a back rest and a leg rest, respectively hinged to one another and so shaped that, when folded into so-called "closed" positions, they constitute a carrying case. This carrying case is adapted, when closed, to house a wheeled running gear provided with a telescoping handle. The running gear is at that time completely detached from all parts of the body and loosely housed within the case when the latter is closed. When the case is opened and distended to form the body of the stroller, the several parts of the body are adapted to be detachably secured to the running gear and the handle extended to render the stroller capable of supporting a child and usable in the manner of strollers generally.

Important features of this invention will be apparent from the following detailed description and appended claim when read in conjunction with the accompanying drawings.

The accompanying drawings illustrate one practical embodiment of the invention, but the construction therein shown is to be understood as illustrative, only, and not as defining the limits of the invention.

Fig. 1 shows the carrying case in portable closed condition.

Fig. 2 shows the case partially opened to permit of removal of the running gear positioned therein.

Fig. 3 shows both the body of the case, the running gear and handle extended and the body ready for attachment to the running gear and handle.

Fig. 4 is a side elevation of all of the parts of the stroller in assembled relation.

Fig. 5 is a section on the line 5—5 of Fig. 6.

Fig. 6 is a section on the line 6—6 of Fig. 5.

The body of the stroller of this invention is made in three sections 1, 2 and 3, respectively, of which 1 is the seat, 2 the back rest, and 3 the leg rest. The seat 1 is provided along its lateral edges with upstanding walls 4 constituting the arms of the seat and with a rear wall 5 constituting the rear of the seat. The back rest 2 is provided at its lateral edges with tapering wings 6, simulating the wings of a so-called wing back chair. The leg rest 3 is provided at its lateral edges with substantially triangular walls 7, provided across their ends with a wall 8 against which the feet of the occupant may rest.

The wings 6 and the walls 7 are substantially triangular in shape, while the arms 4 of the seat are substantially trapezium in form. The back rest 2 of the seat has a flexible hinge connection at 9 with the rear wall 5 of the seat, while the leg rest 3 has a similar flexible hinged connection 10 with the forward edge of the seat. The parts are so shaped and proportioned that the back rest 2 may be folded to bring the forward edges of the wings 6 into contact with the upper edges of the arms 4 and the leg rest 3 folded, so that the upper edges of the walls 7 are brought into engagement with the forward edges of the arms 4 to produce the closed carrying case shown in Fig. 1. This case is provided with an appropriate latch 11 and carrying handle 12.

The running gear, indicated generally by the reference character 13 in Fig. 3, is separate from and unattached to the body of the stroller when the running gear is in the case. It comprises front and rear inverted substantially U-shaped frames 14 and 15 to which wheels 16 are attached. An appropriate upper brace 17 extends across the upper portion of the running gear and is attached at its opposite ends to the frames 14 and 15, while a horizontally disposed U-shaped lower brace 18 rigidly secures the lower portions of these frames to one another and extends across the rear end of the running gear.

A handle 19 is attached to the lower brace 18 as shown. This handle comprises a plurality of sections 20, 21 and 22 which have telescoping relation with one another. The free end of the section 22 is provided with a hand grip 23 of any appropriate design. The lengths of the several telescoping sections 21 and 22 are such that, when in contracted relation, they may be bodily pivoted about the rear reach of the lower brace 18 into the position shown in Fig. 2, wherein the contracted handle will not be materially longer than the undercarriage. This permits the undercarriage and folded handle to be received into and contained within the case as shown in Fig. 2. When thus contained within the case, the case may be closed and locked in closed position with the running gear concealed therein.

It will be noted that the rear frame 14 of the running gear is provided at its top with a centrally located keyhole slot 24. A similar slot 25 is located centrally of the forward frame 15 and a similar keyhole slot 26 is formed in the telescoping section 21 of the handle. With these slots locking devices 24a, 25a and 26a are adapted to respectively cooperate when the body of the stroller is unfolded and placed in cooperative relation with the running gear and the extended handle 19. All of these locking devices are of the same construction and one of them is shown for the purpose of illustration in Figs. 5 and 6. Each embodies a locking pin 27 provided at one end with a laterally projecting lug 28. At its opposite end, the pin has a knob 29 of any appropriate shape and between the knob and the front face of the back rest 2 is interposed a coil spring 30 which normally tends to retract the pin to a point where it will not extend beyond the outer surface of the case.

When the several parts of the stroller are brought into the relative positions shown in Fig. 4, the locking pins 27 of the several locking devices 24a, 25a and 26a will align with the keyhole slots 24, 25 and 26, respectively, and by manipulating the knobs 29, the pins may be forced through these keyhole slots and then rotated 90° to lock the seat 1 to the frame 14 of the running gear, the back rest 2 to the telescoping section 21, and the leg rest 3 to the forward frame 15 of the running gear.

In the accompanying drawings I have shown one type of locking device which may be used in conjunction with keyhole slots as described. However, I am aware that many other types of locking devices for cooperation between these parts for holding the parts in rigid assembled relation may be employed without departing from this invention.

Irrespective of the particular locking devices used, the parts are locked in position, and there will result relatively rigid construction well able to support and transport a child in the stroller. In practice the surfaces of the seat, back rest and leg rest which would otherwise contact with the body of the child, are upholstered in any appropriate manner as by a covering of sponge or foam rubber or the like 31, and the several knobs 29 will impress themselves into the upholstery, as shown for example in Fig. 5, so as not to be uncomfortable to the occupant.

In practice the pin of the locking device 26a may lock only to the telescoping section 21 or it may serve to lock the sections of the handle in extended relation by providing both of the sections 21 and 22 with keyhole slots which register when these sections are in extended relation, so that the corresponding pin 27 will pass through both sections. In Fig. 4 a spring clutch 22a is used to lock the section 22 in extended position.

After the stroller has been in use to transport a child and it is desired to render the same readily portable, the locking devices 24a, 25a and 26a are released from the cooperating parts of the running gear and handle, several sections of the handle are telescoped into contracted relation and the handle then folded under as shown in Fig. 2. The running gear and handle are thereby completely disconnected from the body and they may be then positioned within the case as shown in said figure. The several sections of the body may then be folded into closed relation and locked in this relation by the catch 11. The case may then be picked up and carried like any ordinary piece of luggage.

It will be apparent from the foregoing detailed description that all of the parts of this invention are relatively simple and can be manufactured at relatively low cost. The body which constitutes the case when folded may be made in a manner common to ordinary luggage. The running gear may be completely assembled and welded or otherwise rigidly constituted for it does not have to be folded. Consequently it can be made extremely light and still possess the requisite strength for the purpose for which it is intended. The telescoping sections of the handle may also be made of relatively light gauge tubing so that the whole construction will not weigh more than ordinary packed luggage and ordinarily will weigh less than the usual traveling case packed with clothing, shoes and other traveling accessories.

The foregoing detailed description sets forth the invention in its preferred practical forms, but the invention is to be understood as fully commensurate with the appended claim.

Having thus fully described the invention, what I claim as new and desire to secure by Letters Patent is:

In a combined stroller and carrying case, a stroller body comprising a seat, a back rest and a leg rest respectively pivoted to one another along contiguous transverse edges and shaped to collectively form a carrying case when folded into closed positions and to form a stroller body adapted to receive a child when unfolded, in combination with a running gear comprising a rigid, non-collapsible frame having wheels and a collapsible handle pivoted to said frame, said frame and handle being of overall dimensions to be contained in the confines of said carrying case, attaching devices for detachably securing one end of the running gear frame to the seat and the other end of the pivoted leg rest when the body is unfolded, said running gear being demountable from the body when desired to permit said running gear to be placed within the case.

References Cited in the file of this patent

UNITED STATES PATENTS

| | | |
|---|---|---|
| 1,742,137 | De Grasse | Dec. 31, 1929 |
| 2,022,400 | Bloom | Nov. 26, 1935 |
| 2,693,366 | Randolph | Nov. 2, 1954 |

FOREIGN PATENTS

| | | |
|---|---|---|
| 203,079 | Great Britain | Sept. 6, 1923 |
| 561,451 | Great Britain | May 19, 1944 |